United States Patent
Sumioka et al.

(10) Patent No.: US 8,791,622 B2
(45) Date of Patent: *Jul. 29, 2014

(54) DRIVING CIRCUIT FOR VIBRATION-TYPE ACTUATOR

(71) Applicant: Canon Kabushiki Kaisha, Tokyo (JP)

(72) Inventors: Jun Sumioka, Yokohama (JP); Kenichi Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/017,089

(22) Filed: Sep. 3, 2013

(65) Prior Publication Data

US 2014/0009088 A1  Jan. 9, 2014

Related U.S. Application Data

(63) Continuation of application No. 12/905,993, filed on Oct. 15, 2010, now Pat. No. 8,552,619.

(30) Foreign Application Priority Data

Nov. 20, 2009  (JP) ................ 2009-265234

(51) Int. Cl.
*H01L 41/09* (2006.01)
(52) U.S. Cl.
USPC ........................................ 310/317
(58) Field of Classification Search
USPC ............ 310/316.01–316.03, 317–319
See application file for complete search history.

(56) References Cited

U.S. PATENT DOCUMENTS

| | | |
|---|---|---|
| 1,587,098 A | 6/1926 | Whittle |
| 2,805,400 A | 9/1957 | Seddon |
| 3,432,691 A | 3/1969 | Shoh |
| 3,980,905 A | 9/1976 | Miller |
| 4,353,004 A | 10/1982 | Kleinschmidt |
| 4,387,352 A | 6/1983 | Routh |
| 4,560,998 A | 12/1985 | Wimmer |
| 4,706,048 A | 11/1987 | Atalar |
| 4,966,119 A | 10/1990 | Mitsuyasu |
| 5,140,231 A | 8/1992 | Kashiyama |

(Continued)

FOREIGN PATENT DOCUMENTS

| | | |
|---|---|---|
| JP | 5016277 B | 3/1993 |
| JP | 2002-223576 A | 8/2002 |
| JP | 2002-223577 A | 8/2002 |

OTHER PUBLICATIONS

LC circuit. In Wikipedia, The Free Encyclopedia. (Jan. 28, 2013) as edited by BD2412 at 17:12 UTC, Jan. 27, 2013 from http://en.wikipedia.org/w/index.php?title=LC_circuit&oldid=535194366.

*Primary Examiner* — Thomas Dougherty
(74) *Attorney, Agent, or Firm* — Canon USA, Inc., IP Division

(57) ABSTRACT

An apparatus includes a vibration-type actuator and a driving circuit. The vibration-type actuator includes a vibration member and a moving member, wherein the vibration member includes an electro-mechanical energy conversion element and the moving member is configured to move relative to the vibration member. The driving circuit includes a capacitor and an inductor connected in series with the capacitor to the electro-mechanical energy conversion element. In an example, parameters of the driving circuit are set such that, when a series resonance frequency of the inductor and the capacitor is denoted by fs and a resonance frequency of the vibration member is denoted by fm, a condition $0.73 \cdot fm < fs < 1.2 \cdot fm$ is satisfied.

20 Claims, 13 Drawing Sheets

(56) References Cited

U.S. PATENT DOCUMENTS

| | | |
|---|---|---|
| RE37,639 E | 4/2002 | Ehara |
| 6,480,076 B2 | 11/2002 | Yip |
| 7,596,849 B1 | 10/2009 | Carpenter |
| 7,762,124 B2 | 7/2010 | Okaguchi |
| 8,207,651 B2 | 6/2012 | Gilbert |
| 8,552,619 B2 * | 10/2013 | Sumioka et al. .............. 310/317 |
| 2004/0195935 A1 | 10/2004 | Jansson |
| 2007/0173808 A1 | 7/2007 | Goble |

* cited by examiner

FREQUENCY (Hz)

DRIVING CIRCUIT FOR VIBRATION-TYPE ACTUATOR

CROSS REFERENCE TO RELATED APPLICATIONS

The present application is a continuation of U.S. patent application Ser. No. 12/905,993, filed on Oct. 15, 2010, which claims priority from Japanese Patent Application No. 2009-265234, filed Nov. 20, 2009, all of which are hereby incorporated by reference herein in their entirety.

BACKGROUND OF THE INVENTION

1. Field of the Invention

The present invention relates to a driving circuit configured to drive a vibration-type actuator.

2. Description of the Related Art

The vibration-type actuator is a non-electromagnetically driving actuator configured to generate a high-frequency vibration in an electro-mechanical energy conversion element such as a piezoelectric element by applying an alternating voltage to the electro-mechanical energy conversion element whereby vibration energy is output in the form of continuous mechanical motion. The vibration-type actuators are classified into a standing wave type and a traveling wave type according to types of generated vibrations.

FIG. 16 illustrates a conventional driving circuit configured to drive a vibration-type actuator of the traveling wave type (see Japanese Patent Publication No. 5016277). A vibration member 101 is a combination of a piezoelectric element and an elastic element. The piezoelectric element is applied with an alternating voltage via driving electrodes 101a and 101b. An oscillator 601 generates an alternating signal corresponding to a driving frequency. A switching circuit 602 operates such that a switching element in the switching circuit 602 turns on and off in accordance with the alternating signal supplied from the oscillator 601 thereby generating an alternating voltage. The switching circuit 602 is connected to a DC voltage source (not shown) such that the alternating voltage is generated from a DC voltage supplied from the DC voltage source.

The actuator shown in FIG. 16 employs a two-phase driving scheme. In this scheme, alternating voltages with different phases are provided from two parts of the driving circuit. These two parts of the driving circuit are similar except that the phase of an input alternating voltage is shifted by ±90° by a 90°-phase shifter 603. Therefore, the following explanation is given only for a part 604 that is one of these two parts.

The alternating voltage Vi output from the switching circuit 602 is applied to a primary coil 401a of a transformer 401, and stepped up by an amount corresponding to the turn ratio of the secondary coil 401b to the primary coil 401a of the transformer 401. The stepped-up alternating voltage Vo is passed through an inductor 102 connected in series to the secondary coil 401b of the transformer 401 to remove harmonic components from the waveform of the alternating voltage Vo. The resultant alternating voltage Vo is applied to the driving electrode 101a. In the actuator disclosed in Japanese Patent Publication No. 5016277, a capacitor 103 is connected to the primary coil 401a of the transformer 401 such that series resonance occurs between the capacitor 103 and the primary coil 401a whereby the frequency characteristic of the alternating voltage Vo has a peak. Note that the series resonance frequency of the series of the capacitor 103 and the primary coil 401a of the transformer 401 is set to be equal to the resonance frequency of the vibration member 101. This configuration makes it possible to adjust the alternating voltage Vo by controlling the driving frequency even when a change occurs in the resonance frequency of the vibration member 101, whereby it is possible to reduce the power consumption.

SUMMARY OF THE INVENTION

In the conventional driving circuit for the traveling-wave vibration actuator, a great change occurs in the alternating voltage Vo applied to the vibration member 101 in a frequency range from a starting frequency to an operation frequency corresponding to a specified number of rotations, i.e., the frequency characteristic of the alternating voltage Vo has a steep gradient close to the resonance frequency of the vibration member 101. This results in a change in voltage amplitude, which causes degradation in responsiveness to a driving speed, which in turn causes degradation in controllability. In view of the above, the present invention provides a driving circuit having a small change in output voltage over a full driving frequency range from a starting frequency to an operation frequency.

In an aspect of the present invention, there is provided and apparatus that includes a vibration-type actuator having a vibration member and a moving member, wherein the vibration member includes an electro-mechanical energy conversion element and the moving member is configured to move relative to the vibration member, and includes a driving circuit having a capacitor and an inductor connected in series with the capacitor to the electro-mechanical energy conversion element, wherein parameters of the driving circuit are set such that, when a series resonance frequency of the inductor and the capacitor is denoted by fs and a resonance frequency of the vibration member is denoted by fm, a condition $0.73 \cdot fm < fs < 1.2 \cdot fm$ is satisfied.

In an aspect of the present invention, there is provided an apparatus that includes a vibration-type actuator having a vibration member and a moving member, wherein the vibration member includes an electro-mechanical energy conversion element and the moving member is configured to move relative to the vibration member, and a driving circuit having a transformer and an inductor and a capacitor, wherein the transformer includes a primary coil and a secondary coil and is connected in parallel to the electro-mechanical energy conversion element, wherein an alternating voltage is configured to be applied to the primary coil, and wherein the inductor and the capacitor are located at least one of on a primary side and a secondary side of the transformer such that the inductor and the capacitor are connected in series to the electro-mechanical energy conversion element, wherein parameters of the driving circuit are set such that, when a series resonance frequency of the inductor and the capacitor is denoted by fs and a resonance frequency of the vibration member is denoted by fm, a condition $0.73 \cdot fm < fs < 1.2 \cdot fm$ is satisfied.

Thus, the driving circuit according to any aspect of the present invention provides an output voltage with a small change over the full frequency range from the starting frequency to the operation frequency and thus provides improved frequency controllability.

Further features of the present invention will become apparent from the following description of exemplary embodiments with reference to the attached drawings.

DESCRIPTION OF THE EMBODIMENTS

The driving circuit of the vibration-type actuator according to the present invention is described in further detail below with reference to embodiments in conjunction with the accompanying drawings. The driving circuit according to the present invention is applicable to a vibration-type actuator that is configured as follows. That is, the vibration-type actuator driven by the driving circuit according to the present invention includes a vibration member having an electro-mechanical energy conversion element such as a piezoelectric element and an elastic element connected to the electro-mechanical energy conversion element, and also includes a moving member that is urged into contact with the elastic element and that moves relative to the vibration member. The electro-mechanical energy conversion element is applied with a plurality of alternating voltages that are different in phase such that a vibration wave is generated in the elastic element. The generated vibration wave causes the elastic element to have an elliptic motion at a driving part (in contact with the moving member) in the elastic element, and this elliptic motion causes the moving member to move relative to the vibration member.

In embodiments described below, it is assumed by way of example that the driving circuit includes two parts, i.e., a first-phase part and a second-phase part such that the piezoelectric element serving as the electro-mechanical energy conversion element is driven by alternative voltages with different phases output from the respective parts. In this configuration, the first-phase part and the second-phase part of the driving circuit are similar except that a phase of an alternating voltage input to each part is shifted by ±90° by a 90° phase shifter 603, and thus the following explanation is given only for one part (corresponding to the part 604 shown in FIG. 16). Note that the present invention is not limited to the two-phase driving scheme, but the present invention is also applicable to other types of driving circuits such as a driving circuit configured to drive a traveling-wave-type actuator by alternating voltages with four or more phases, a driving circuit configured to drive a standing-wave-type actuator, etc. An oscillator that generates an alternative signal and a switching circuit are not essential parts of the present invention, and there is no particular restriction on these parts. Therefore, the following description is given only for a part which, in the driving circuit shown in FIG. 16, receives an alternating voltage Vi and outputs an alternating voltage Vo applied to the vibration member 101.

First Embodiment

Figure 1A:
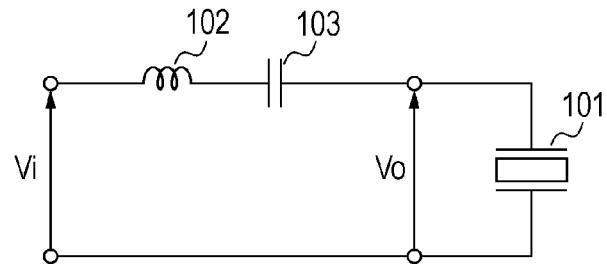
FIGS. 1A and 1B are diagrams illustrating a driving circuit configured to drive a vibration-type actuator according to an embodiment of the present invention.
Figure 1B:
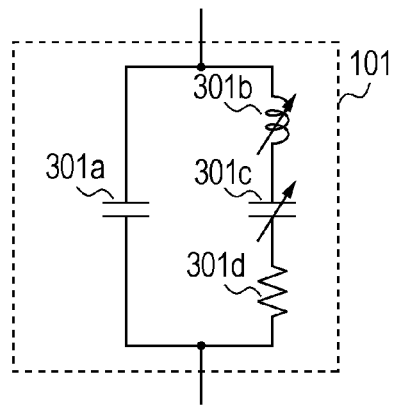

Example in which an Inductor and a Capacitor are Connected in Series to a Vibration Member Referring to FIGS. 1A to 1C, a driving circuit according to a first embodiment is described below. FIG. 1A illustrates the driving circuit of the vibration-type actuator according to the first embodiment. The driving circuit is configured such that an inductor 102 and a capacitor 103 are connected in series to the vibration member 101 (i.e., in series to the electro-mechanical energy conversion element). An inductance element such as a coil may be used as the inductor 102, and a capacitance element such as a film capacitor may be used as the capacitor 103. In the present embodiment of the invention, the series resonance frequency of the inductor 102 and the capacitor 103 is set to be substantially equal to the resonance frequency of the vibration member 101.

An equivalent circuit of the vibration member 101 is described below with reference to FIG. 1B. FIG. 1B illustrates an equivalent circuit of the one-phase part of the vibration member 101. The equivalent circuit of the vibration member 101 includes an RLC series circuit corresponding to a mechanically vibrating part (an equivalent coil 301b with self-inductance Lm, an equivalent capacitor 301c with capacitance Cm, and an equivalent resistor 301d with resistance Rm) and a capacitor 301a with an intrinsic capacitance Cd of the vibration member 101. Note that the capacitor 301a is connected in parallel with the RLC series circuit.

Hereinafter, the series resonance frequency of the inductor 102 and the capacitor 103 is denoted by fs, and the resonance frequency of the vibration member 101 is denoted by fm. Furthermore, if the self-inductance of the inductor 102 is denoted by L, and the capacitance of the capacitor 103 is denoted by C, then fs and fm are given as follows.

$$fs = 1/(2\pi\sqrt{LC}) \quad (1\text{-}1)$$

$$fm = 1/(2\pi\sqrt{LmCm}) \quad (1\text{-}2)$$

By setting fs to be substantially equal to fm, it becomes possible to obtain a gradual change in frequency characteristic of the alternating voltage Vo in a range close to fm.

Figure 1C:
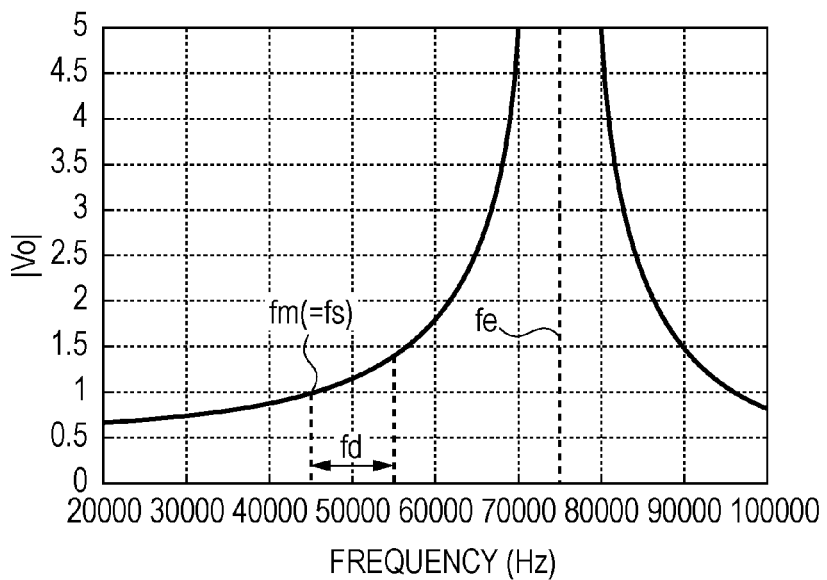
FIG. 1C is a diagram illustrating a simulated characteristic thereof.

FIG. 1C shows a simulated alternating voltage Vo for a case where the series resonance frequency of the inductor 102 and the capacitor 103 is set to be equal to the resonance frequency of the vibration member 101. In this simulation, parameters were set as follows. The self-inductance L of the inductor 102 was set to 2 mH, the capacitance C of the capacitor 103 was set to 6.5 nF, the self-inductance Lm of the equivalent coil 301b was set to 0.1 H, and the capacitance Cm of the equivalent capacitor 301c was set to 130 pF. In FIG. 1C, a vertical axis indicates the gain of the amplitude of the alternating voltage Vo at the output side relative to the alternating voltage Vi at the input side. For example, when the gain of the amplitude is equal to 3, if the amplitude of Vi is 100 V, then the amplitude of Vo is 300 V. As can be seen from FIG. 1C, by setting fs to be equal to fm, it is possible to achieve a gradual change in the frequency characteristic of the alternating voltage Vo in a range close to fm. The change in the amplitude of the alternating voltage Vo in the range close to fm is caused by a change in impedance of the self-inductance Lm and the capacitance Cm of the mechanically vibrating part of the vibration member 101. In the present embodiment, this problem is reduced by setting fs to be equal to fm thereby achieving impedance matching with the impedance of the mechanically vibrating part of the vibration member 101 and thus reducing the change in the amplitude of the alternating voltage Vo. The reduction in the change in the frequency characteristic of the alternating voltage Vo in the range close to fm leads to a reduction in change of the alternating voltage Vo due to a variation of a load (equivalent resistor 301d) or the inductor 102. This is because the good impedance matching with the mechanically vibrating part of the vibration member 101 is maintained, and thus changes in characteristic of circuit elements do not have a significant influence on the frequency characteristic in the frequency range around fm.

Note that the parameters are also set such that an electric resonance of the inductor 102 and the capacitor 103 and the capacitor 301a of the vibration member 101 causes the amplitude of the alternating voltage Vo to have a peak at a particular frequency. Hereinafter, the peak frequency of the alternating voltage Vo is denoted by fe. As can be seen in FIG. 1C, by setting fe to be higher than fm, it is possible to obtain a frequency characteristic with a small voltage change in a frequency range from fm to fe regardless of a change in the driving frequency fd of the vibration member 101.

Figure 2A:
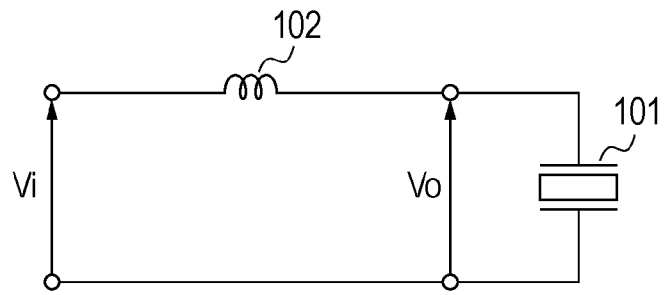
FIG. 2A is a diagram illustrating a comparative example of a driving circuit configured to drive a vibration-type actuator according to a conventional technique.
Figure 2B:
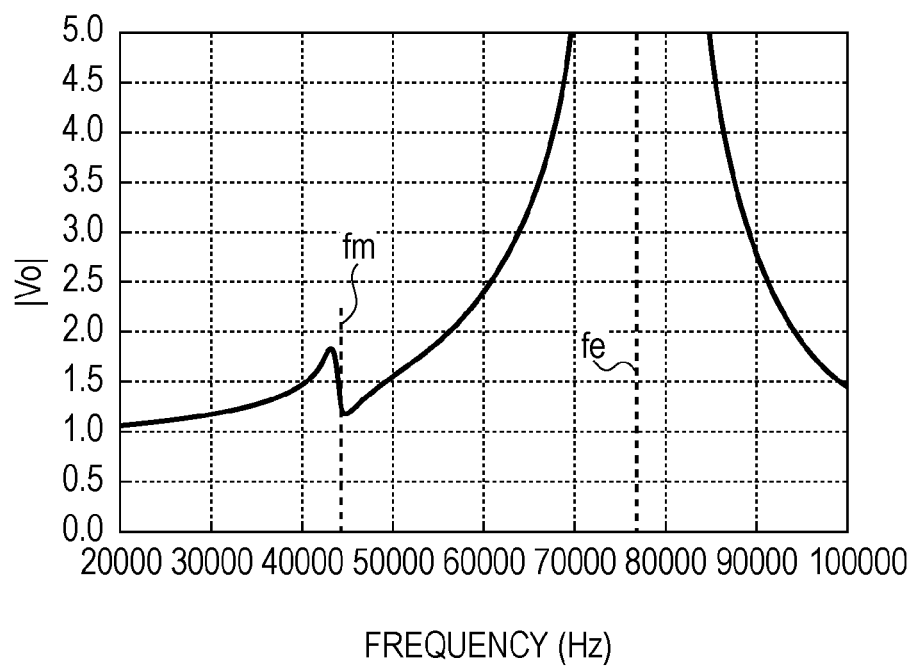
FIG. 2B is a diagram illustrating a simulated characteristic thereof.

First Comparative Example in which Only Inductor is Connected in Series to Vibration Member Referring to FIG. 2, a discussion is given below for a case where only the inductor 102 is connected in series to the vibration member 101. FIG. 2A illustrates a driving circuit in which only an inductor 102 is connected in serial to the vibration member 101. FIG. 2B shows a simulated frequency characteristic of the alternating voltage Vo for a case in which the circuit shown in FIG. 2A is used. In the simulation, parameters were set such that the electric resonance of the inductor 102 and the capacitor 301a of the vibration member 101 caused the amplitude of the alternating voltage Vo to have a peak at a particular frequency. More specifically, the parameters were set as follows. The self-inductance L of the inductor 102 was to be 1.23 mH and the intrinsic capacitance Cd of the capacitor 301a of the vibration member 101 was set to 3.5 nF such that the alternating voltage Vo had a peak at a frequency of 76.707 kHz. Furthermore, in the simulation, the resonance frequency fm of the vibration member 101 was assumed to be 44.142 kHz. As can be seen from FIG. 2B, the frequency characteristic of the alternating voltage Vo has a great change in voltage in a frequency range around fm, which results in degradation in controllability. Another problem is that a steep change occurs in the alternating voltage Vo in a range from the resonance frequency fm of the vibration member 101 to the peak frequency fe of Vo, and this steep change causes a high voltage to be output in a high range of the driving frequency. Therefore, circuit elements such as a switching element used in the driving circuit need to have a high withstand voltage, which causes an increase in cost. Furthermore, this leads to an increase in the alternating voltage Vo due to a variation of the load (equivalent resistor 301d) or the inductor 102.

Maximum Allowable Difference Between fs and fm

In the present embodiment of the invention, the series resonance frequency fs of the inductor 102 and the capacitor 103 connected in series to the vibration member 101 does not need to be exactly equal to the resonance frequency fm of the vibration member 101. That is, it is possible to achieve a gradual change in the frequency characteristic of the alternating voltage Vo in a frequency range around fm as long as the difference between fs and fm is within a particular narrow range, although the smaller the difference is between fs and fm, the better result is obtained.

Figure 3A:
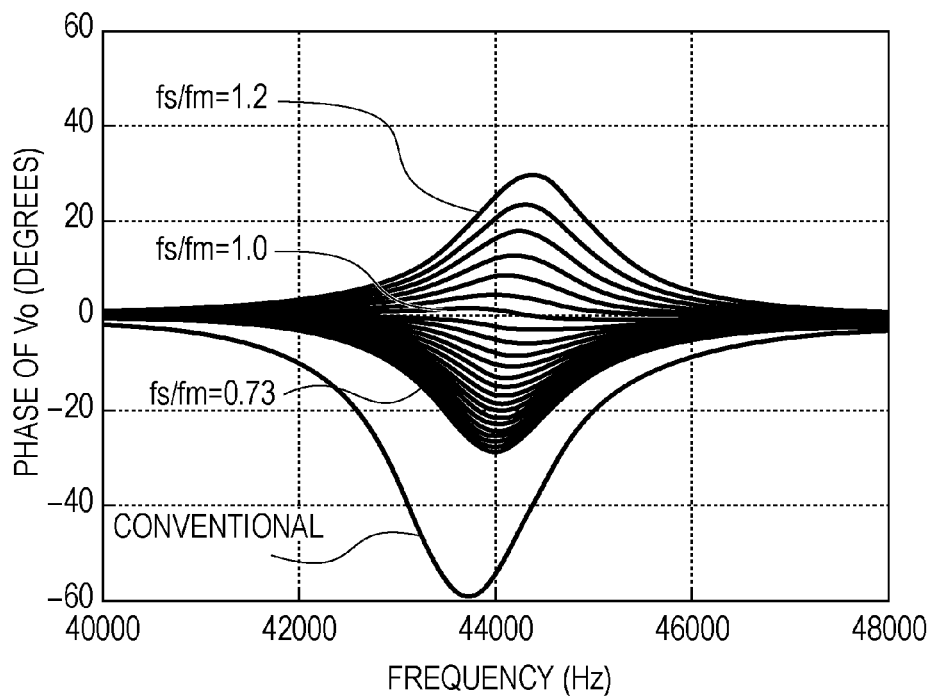
FIG. 3A is a diagram illustrating a simulation result in terms of a phase of an alternating voltage Vo.

To determine a range of fs in which the advantages of the present embodiment of the invention are achieved, an investigation is made on an effect of a change in phase of the alternating voltage Vo in a frequency range around the resonance frequency fm of the vibration member 101. FIG. 3A shows a result of simulation in terms of the phase of the alternating voltage Vo where a horizontal axis indicates the frequency, and a change in phase of Vo is shown for a range from 40 kHz to 48 kHz around a resonance frequency fm set to be equal to 44.142 kHz. The simulation was performed for the driving circuit shown in FIG. 1A. In the simulation, the series resonance frequency fs of the inductor 102 and the capacitor 103 was varied in a range from 0.73 to 1.2 in relative value with respect to fm (i.e., fs/fm), and the result is plotted in FIG. 3A. Note that when fs/fm was varied, L and C were adjusted so that the peak frequency fe was maintained at 61.798 kHz (=1.4·fm). The reason why the peak frequency fe was maintained at the constant value is that a change in the value of the peak frequency fe causes a great change in the amplitude of Vo in a frequency range around the resonance frequency fm of the vibration member 101. For the purpose of comparison, the simulation was also performed for the circuit according to the conventional technique shown in FIG. 2A, and a result was plotted. In the simulation for the circuit shown in FIG. 2A, the self-inductance L of the inductor 102 was set to 1.97 mH, and the peak frequency fe of the alternating voltage Vo was set to be 61.798 kHz (=1.4·fm).

From FIG. 3A, it can be seen that the conventional circuit configuration has a great phase delay. The maximum phase delay almost reaches 60°. In contrast, when fs was set such that fs/fm=1, Vo had substantially no phase change. When fs/fm=1, the self-inductance L of the inductor 102 was 4.17 mH and the capacitance C of the capacitor 103 was 3.12 nF. Generally, the phase change increases in a negative direction with decreasing fs/fm<1, while the phase change increases in a positive direction with increasing fs/fm>1.

Figure 3B:
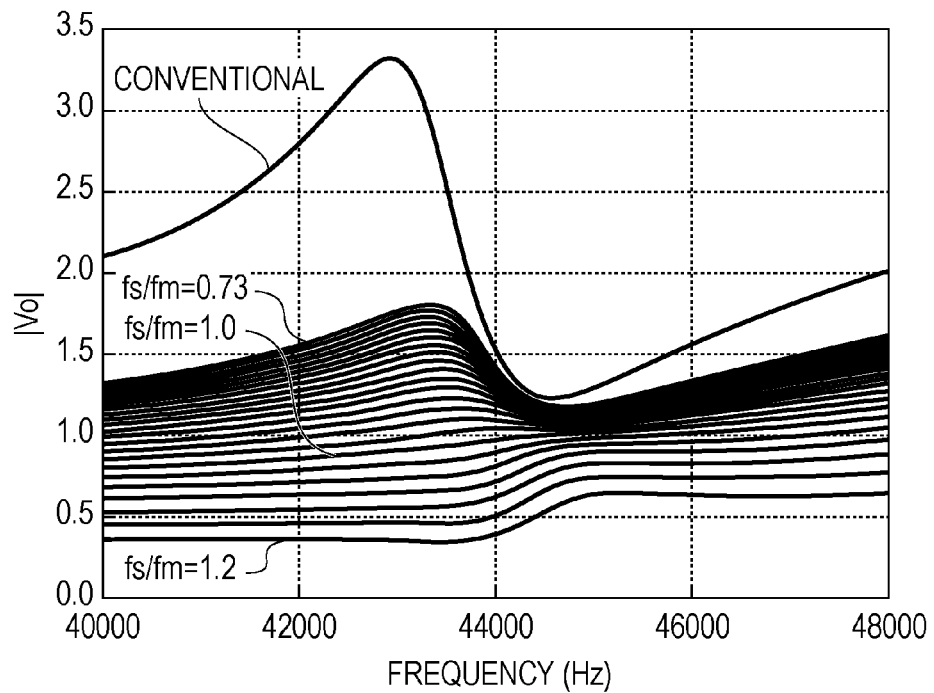
FIG. 3B is a diagram illustrating a simulation result in terms of a change in alternating voltage Vo as a function of a frequency.

A simulation was also performed in terms of a dependency of the alternating voltage Vo on the frequency to detect a relationship between the phase change of the alternating voltage Vo shown in FIG. 3A and a change of the amplitude of the alternating voltage Vo. The result is shown in FIG. 3B. The simulation was performed under the same condition as that of FIG. 3A. The change of the alternating voltage Vo was calculated for values of fs/fm from 0.73 to 1.2, and the result was plotted. For the purpose of comparison, the change of the alternating voltage Vo for the conventional circuit configuration was also calculated and the result was plotted. As can be seen, the phase change shown in FIG. 3B roughly corresponds to the voltage change shown in FIG. 3A. That is, the change in the amplitude of Vo increases with increase change in phase of Vo.

Figure 4:
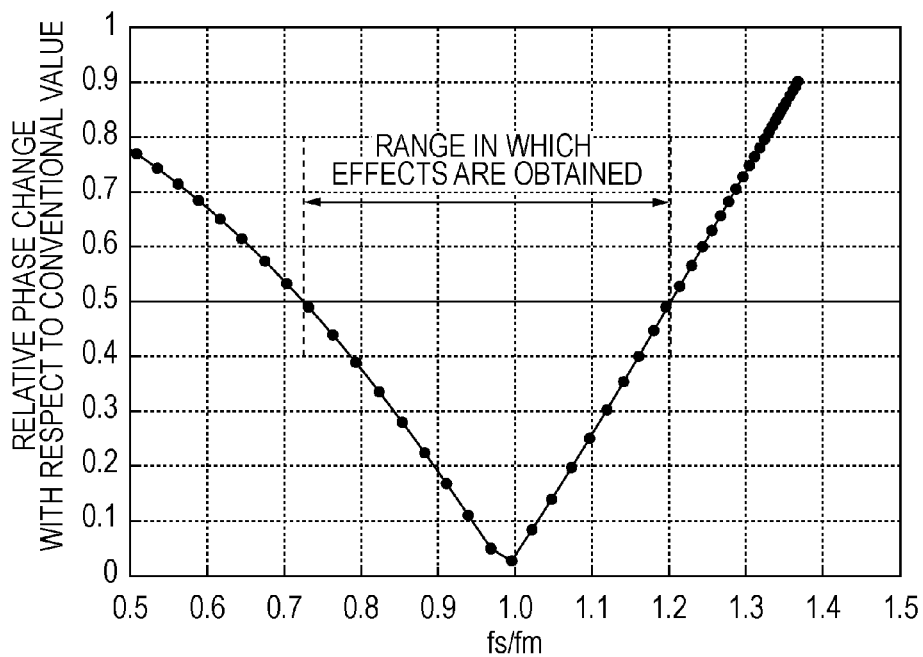
FIG. 4 is a diagram illustrating a simulation result in terms of a relative change in phase with respect to a change that occurs in a conventional technique as a function of fs/fm.

FIG. 4 illustrates a simulation result in terms of a relative change in phase with respect to a change that occurs in the conventional configuration as a function of fs/fm. In FIG. 4, a horizontal axis represents fs/fm, i.e., the ratio of fs to the resonance frequency fm of the vibration member 101. A vertical axis represents the ratio of the change in phase to the change in phase that occurs in the conventional configuration. The ratio of the change in phase was calculated as follows. First, the absolute value of the change in phase of Vo that occurs in the conventional configuration was calculated for a frequency range from 40 kHz to 48 kHz, and a maximum value was detected. Hereinafter, the detected maximum value is referred to as the maximum phase change in the conventional configuration. Next, for the configuration shown in FIG. 1A, the absolute value of the phase change of Vo was calculated as a function of fs/fm for a frequency range from 40 kHz to 48 kHz, and a maximum value was detected. Hereinafter, the detected maximum value is referred to as the maximum phase change depending on fs/fm. The ratio of the maximum phase change depending on fs/fm to the maximum phase change in the conventional configuration was then calculated, and the result is plotted such that the ratio is represented by the vertical axis.

In the present embodiment of the invention, as shown in FIG. 4, when the relative phase change with respect to the phase change of the conventional circuit configuration is defined is smaller than a threshold value set to 0.5, the frequency characteristic of the alternating voltage Vo can be regarded as having a sufficiently small change in a frequency range around fm. Such a small change can be achieved when fs/fm is within a range shown below.

$$0.73 \cdot fm < fs < 1.2 \cdot fm$$

The above result was obtained when parameters were set as follows. The peak frequency fe was set to 61.798 kHz (=1.4·fm), and the intrinsic capacitance Cd of the capacitor 301a of the vibration member 101 was set to 3.5 nF. Note that a similar result is obtained for various values of the peak frequency fe and for various values of the intrinsic capacitance Cd. In the simulation, other parameters were set as follows. The self-inductance Lm of the equivalent coil 301b of the vibration member 101 was set to 0.1 H, the capacitance Cm of the equivalent capacitor 301c was set to 130 pF, and the resistance Rm of the equivalent resistor 301d was set to 1 kΩ.

Thus, by setting fs within the range described above to reduce the phase change of the alternating voltage Vo to a level less than one half of that of the conventional configuration, it also becomes possible to reduce the change in Vo to a level less than one of that of the conventional configuration. That is, even when fs is not exactly equal to fm, if fs and fm satisfy the above-described relationship, it is possible to reduce the change in frequency characteristic of the alternating voltage Vo in the range around fm compared with the conventional circuit configuration. Thus, it is possible to achieve a stable control characteristic due to a synergy effect of the reduction in the change in the alternating voltage Vo and the improvement in phase delay.

Figure 5:
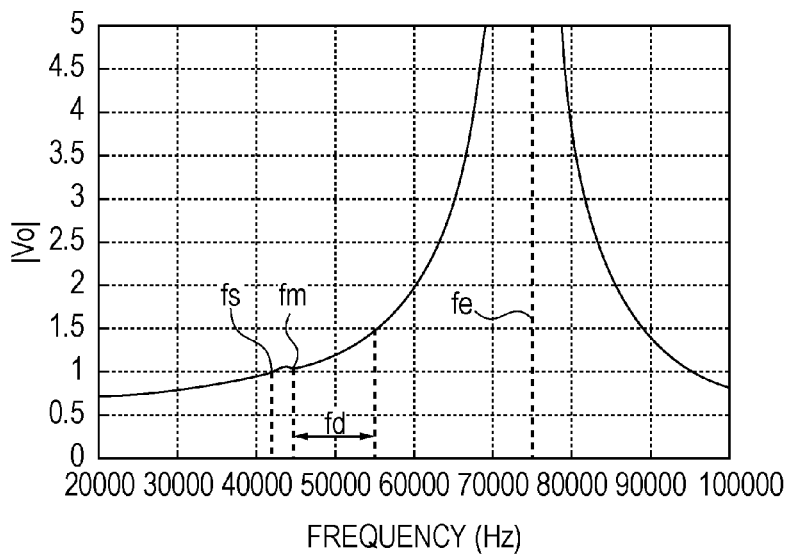
FIG. 5 is a diagram illustrating a simulation result in terms of a frequency characteristic of an alternating voltage Vo for a case where a series resonance frequency fs is lower than a resonance frequency fm of a vibration member.

FIG. 5 shows a result of simulation in terms of the frequency characteristic of the alternating voltage Vo for a case where the relationship between fs and fm satisfies the above condition (and more specifically, the series resonance frequency fs is lower than the resonance frequency fm of the vibration member 101). The simulation was performed for the circuit configuration shown in FIG. 1A. As shown in FIG. 5, the change in the alternating voltage Vo in a range near the resonance frequency fm is smaller than that shown in FIG. 2B. Note that, in the simulation, the resonance frequency of the vibration member 101 was assumed to be 44.142 kHz, and the capacitance of the capacitor 103 was intentionally increased by 10% so that the series resonance frequency fs was set to 0.95·fm, i.e., 42.087 kHz which is smaller by about 2 kHz than fm. As can be seen from the simulation result, even when fs is not exactly equal to fm, it is possible to reduce the change in the alternating voltage Vo in an frequency range around the resonance frequency fm.

Determination of Inductance L of Inductor 102 and Capacitance C of Capacitor 103

Next, a method of determining the capacitance of the capacitor 103 and the inductance of the inductor 102 is described below. The series resonance frequency fs is given by the product of the inductance L of the inductor 102 and the capacitance C of the capacitor 103. Therefore, for a given value of fs, there can be an infinite number of combinations of inductance L and the capacitance C that satisfy the give value of fs. However, if the peak frequency fe of the alternating voltage Vo is first determined, there is only one combination of inductance L and capacitance C for the given fs.

The peak frequency fe of Vo can be calculated from the inductance L of the inductor 102, the capacitance C of the capacitor 103, and the intrinsic capacitance Cd of the capacitor 301a of the vibration member 101 according to equation (1-3) shown below.

$$fe = 1 / \left( 2\pi \sqrt{L \cdot \frac{C \cdot Cd'}{C + Cd'}} \right) \tag{1-3}$$

In practical calculation of the peak frequency fe, the vibration member 101 may be regarded as an equivalent capacitor, and its capacitance may be determined taking into account an effect of the RLC series circuit of the mechanically vibrating part. Hereinafter, the resultant capacitance is denoted by Cd'. For example, when the effect of the RLC series circuit of the mechanically vibrating part provides an equivalent capacitance change of 134 pF, Cd' may be determined as follows.

$$Cd' = Cd - 134 \text{ pF}$$

Figure 6:
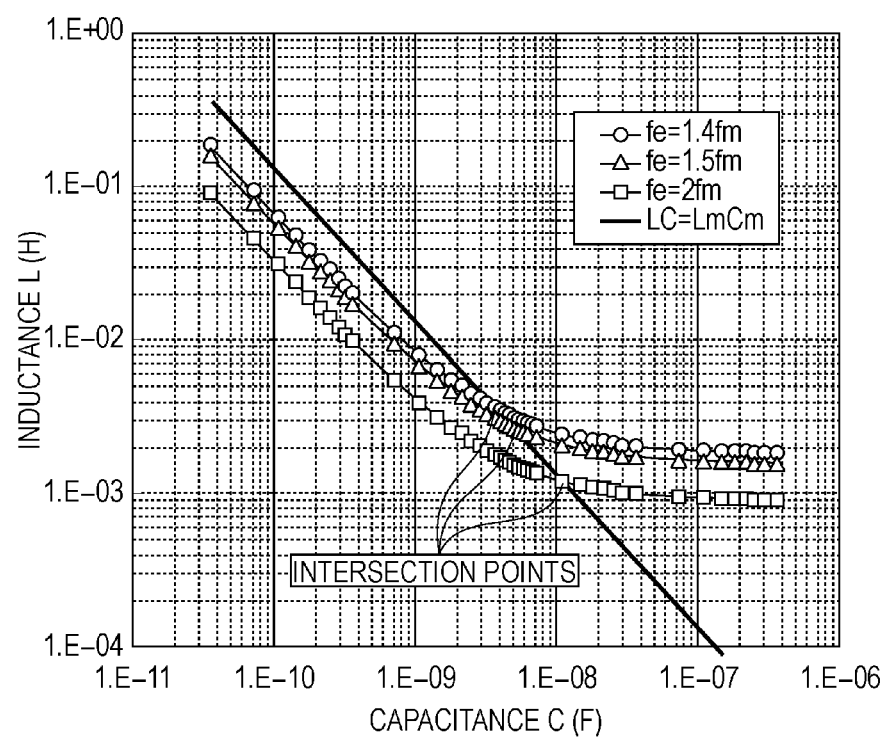
FIG. 6 is a diagram illustrating a relationship between inductance of an inductor and capacitance of a capacitor for a plurality of peak frequencies fe according to an embodiment of the present invention.

By determining the value of the peak frequency fe according to equation (1-3), it is possible to determine a relationship between L and C. FIG. 6 shows the relationship between the inductance L of the inductor 102 and the capacitance C of the capacitor 103 for some values of the peak frequency fe. A horizontal axis indicates the value of C and a vertical axis indicates the value of L. In FIG. 6, values of L and C determined according to equation (1-3) are plotted for three values of fe, i.e., fe=1.4·fm, fe=1.5·fm, and fe=2·fm. In FIG. 6, values of L and C are also plotted for a case where the product L and C is given by LmCm, i.e., for a case where the series resonance frequency fs is equal to fm. As described above, Lm is the self-inductance of the equivalent coil 301b, and Cm is the capacitance of the equivalent capacitor 301c. As shown in FIG. 6, for a particular constant value of fe, each curve representing inductance as a function of capacitance intersects the line of LC=LmCm at one point. Each intersection gives optimum values of inductance L and capacitance C for a case where fs equals fm. For example, if fe=1.4·fm, then L is 4.17 mH and C is 3.12 nF.

The value of fe is discussed in further detail below. In the present embodiment of the invention, when the driving frequency of the vibration member 101 is fd, the peak frequency fe may be set so as to satisfy a condition fe<1.5·fd. The reason for this is described below.

Figure 7:
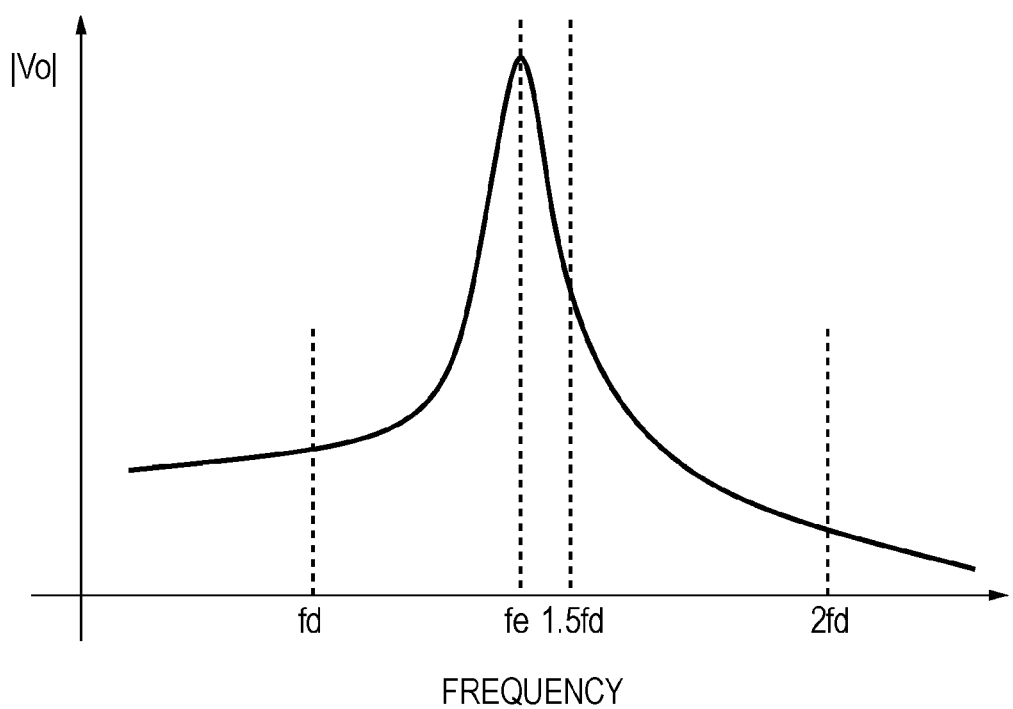
FIG. 7 is a diagram illustrating a frequency characteristic of an alternating voltage Vo for a case where fe<1.5·fd.

FIG. 7 shows a frequency characteristic of the alternating voltage Vo for a case where fe<1.5·fd. In FIG. 7, 2·fd is a second order harmonic frequency of the driving frequency fd. It may be better for the alternating voltage Vo to have a waveform similar to a sine wave having as low harmonic components such as second-order or third-order harmonic components as possible. In practice, the driving waveform of alternating voltage Vo has a pulse duty that is not exactly equal to 50%, and thus it may be better to reduce the second-order harmonic component. For the above reason, by setting the peak frequency fe to a value lower than 1.5·fd, it is possible to reduce the amplitude of the second-order harmonic component of the alternating voltage Vo at the frequency of 2·fd to a level smaller than that at the driving frequency fd. For example, when the driving frequency fd is 46 kHz, 1.5·fd is 69 kHz. In this case, if the inductance L of the inductor 102 is set to be 4 mH, and the capacitance C of the capacitor 103 is set to be 3.25 nF, then the peak frequency fe is 61.3 kHz and thus the above-described condition is satisfied.

Modification of First Embodiment

Figure 8:
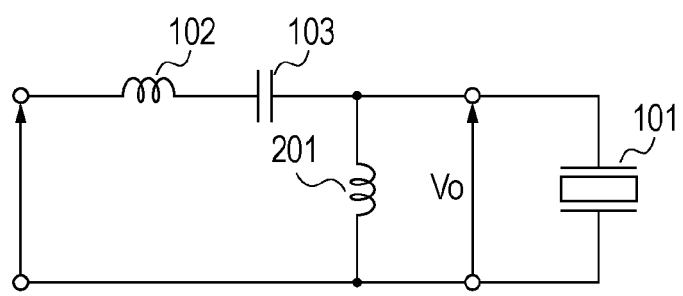
FIG. 8 is a diagram illustrating a driving circuit configured to drive a vibration-type actuator according to a modified embodiment of the present invention.

FIG. 8 illustrates a driving circuit configured to drive a vibration-type actuator according to a modification of the first embodiment of the present invention. In this configuration, an inductor 201 for parallel resonance is connected in parallel to the vibration member 101. The provision of the inductor 201 for parallel resonance causes parallel resonance to occur with the capacitor 301a (the intrinsic capacitance Cd) of the vibration member 101. This makes it possible to achieve a further reduction in the change in the alternating voltage Vo due to a variation of the load (equivalent resistor 301d) or the inductor 102. Note that in the present modification, fs may be determined from equation (1-1) described above.

Second Embodiment

Next, with reference to FIGS. 9A and 9B, a second embodiment of the present invention is described below. The second embodiment is different from the first embodiment described above in that voltage step-up is performed using a transformer.

Figure 9A:
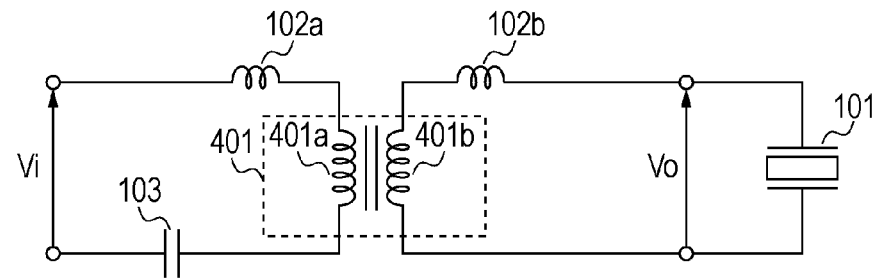
FIG. 9A is a diagram illustrating a driving circuit configured to drive a vibration-type actuator according to an embodiment of the present invention.

FIG. 9A illustrates a driving circuit configured to drive a vibration-type actuator according to the second embodiment of the present invention. In this configuration of the driving circuit, a secondary coil 401b of a transformer 401 is connected in parallel to the vibration member 101 (i.e., the secondary coil 401b of the transformer 401 is connected in parallel to the electro-mechanical energy conversion element), and a capacitor 103 is connected in series to a primary coil 401a of the transformer 401. A capacitance element such as a film capacitor may be used as the capacitor 103. By reducing the coupling of the transformer 401, it is possible to increase the leakage inductance of the primary coil 401a of the transformer 401 and the leakage inductance of the secondary coil 401b of the transformer 401. These leakage inductances can be employed as the inductor. The leakage inductances are equivalently represented by an inductor 102a (leakage inductance of the primary coil 401a of the transformer 401) and an inductor 102b (leakage inductance of the secondary coil 401b of the transformer 401). A series resonance circuit is formed by these two leakage inductances and the capacitor 103. Although the capacitor 103 is connected to a lower terminal of the primary coil 401a of the transformer 401 in the configuration shown in FIG. 9A, the capacitor 103 may be connected to an upper terminal of the primary coil 401a. The series resonance frequency of the leakage inductance 102a of the primary coil 401a, the leakage inductance 102b of the secondary coil 401b, and the capacitor 103 is denoted by fs, and the resonance frequency of the vibration member 101 is denoted by fm. If the leakage inductance 102a of the primary coil 401a of the transformer 401 is denoted by L1, the leakage inductance 102b of the secondary coil 401b of the transformer 401 is denoted by L2, and the turn ratio of the secondary coil 401b to the primary coil 401a is denoted by N, and the capacitance of the capacitor 103 is denoted by C, then $$fs=1/(2\pi\sqrt{\{L_1+(L_2/N^2)\}C}) \tag{2-1}$$

$$fm=1/(2\pi\sqrt{LmCm}) \tag{2-2}$$

As described above, Lm and Cm are equivalent circuit constants associated with the mechanical vibration of the vibration member 101, where Lm is the self-inductance of the equivalent coil 301b and Cm is the capacitance of the equivalent capacitor 301c.

Figure 9B:
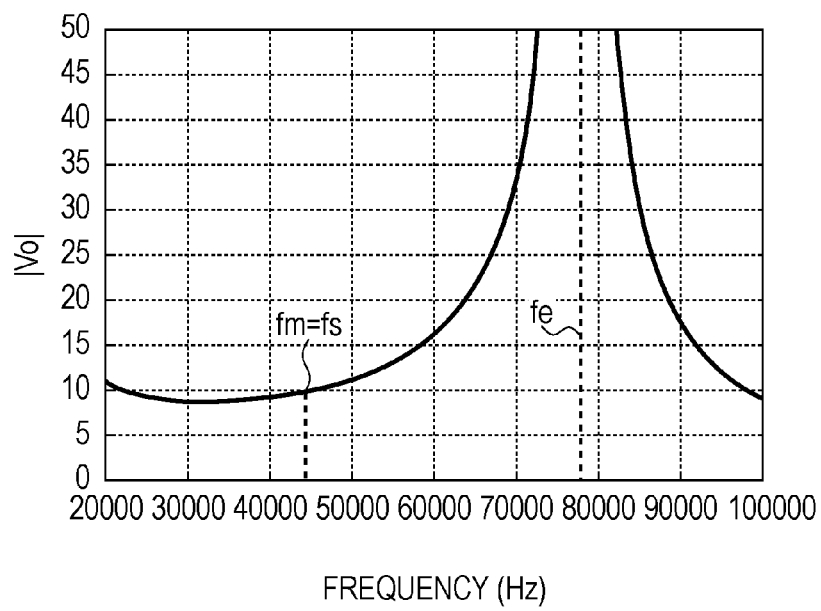
FIG. 9B is a diagram illustrating a simulated characteristic thereof.

FIG. 9B is a diagram illustrating a simulation result in terms of a frequency characteristic of the alternating voltage Vo for a case where the series resonance frequency fs is set to be equal to the resonance frequency fm of the vibration member 101. As can be seen from FIG. 9B, as in the first embodiment, by setting fs to be equal to fm, it is possible to achieve a gradual change in the frequency characteristic of the alternating voltage Vo in a range around fm. In the simulation, L was set to 20 µH (=L1+L2/N2), C to 650 nF, Lm to 0.1H, Cm to 130 pF, and the turn ratio N to 10. The reduction in the change in the frequency characteristic of the alternating voltage Vo in the range close to fm leads to a reduction in change of the alternating voltage Vo due to a variation of a load (equivalent resistor 301d) or the inductor 102. Hereinafter, the peak frequency of the alternating voltage Vo is denoted by fe. By setting fe to be higher than fm as shown in FIG. 9B, it is possible to obtain a frequency characteristic with a small voltage change in a frequency range from fm to fe regardless of a change in the driving frequency fd. However, in the case where the transformer is used, the connection of the inductor 102 and the capacitor 103 causes the alternating voltage Vo to have another peak at a frequency lower than the resonance frequency fm of the vibration member 101. That is, the alternating voltage Vo has two peaks at frequencies higher and lower than fm. In the present embodiment, fe denotes the higher peak.

As in the first embodiment, the series resonance frequency fs may not be exactly equal to the resonance frequency fm of the vibration member 101. The advantages described above may be achieved by setting the series resonance frequency fs within a range around fm so as to satisfy a condition shown below.

$$0.73 \cdot fm < fs < 1.2 \cdot fm$$

By setting fs within the above-described range, it is possible to achieve a stable control characteristic due to a synergy effect of the reduction in the change in the alternating voltage Vo and an improvement in phase delay.

In the case where the transformer is used, a coefficient associated with LC in the formula used in calculation of fs varies depending on whether the inductor 102 and the capacitor 103 are connected to the primary coil or the secondary coil. Thus, there are four configurations as described below.

(1) L and C are connected to the primary side of the transformer.

(2) L and C are connected to the secondary side of the transformer.

(3) L is connected to the primary coil of the transformer and C is connected to the secondary coil of the transformer.

(4) C is connected to the primary coil of the transformer and L is connected to the secondary coil of the transformer.

In the configurations (1) and (2) described above, the coefficient of LC is equal to 1. On the other hand, in the configuration of (3), the coefficient is $N^2$, i.e., the term including LC is given by $N^2 \cdot LC$. This is because L located on the primary side is equivalent to $N^2 \cdot L$ on the secondary side where N is the turn ratio of the transformer. In the configuration (4), the coefficient is $1/N^2$, i.e., the term including LC is given by $(1/N^2) \cdot LC$. This is because C located on the primary side is equivalent to $(1/N^2) \cdot C$ on the secondary side where N is the turn ratio of the transformer.

Figure 10A:
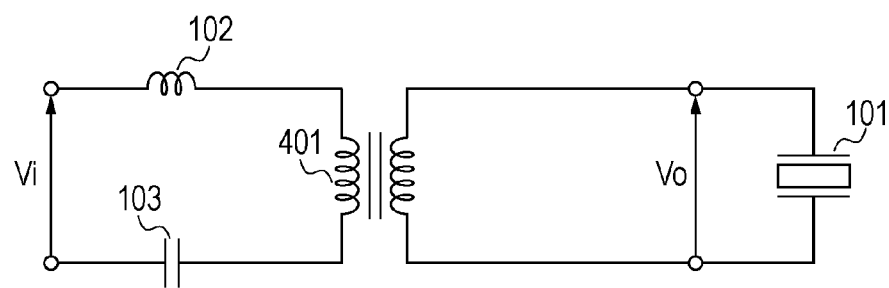
FIG. 10A is a diagram illustrating a driving circuit configured to drive a vibration-type actuator according to a modified embodiment of the present invention.
Figure 10B:
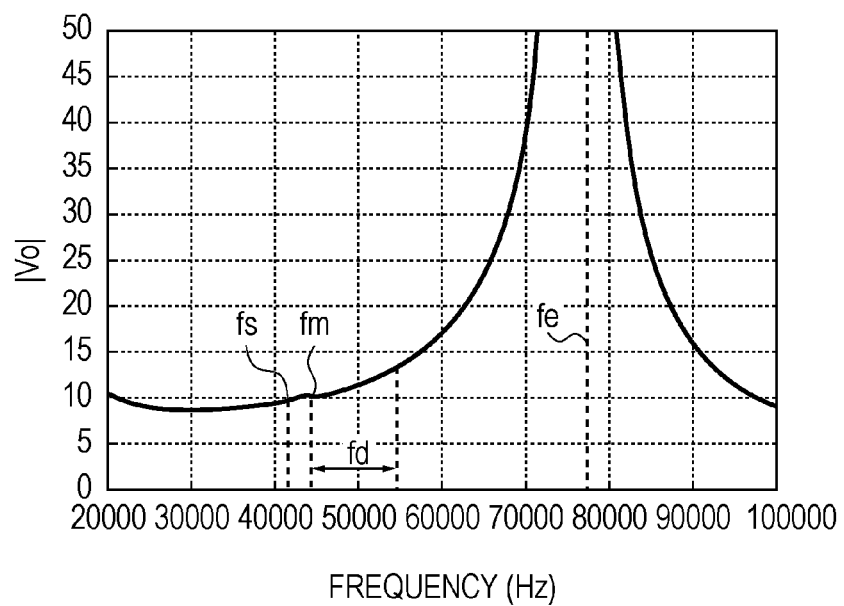
FIG. 10B is a diagram illustrating a simulated characteristic thereof.

Next, FIG. 10B is a diagram illustrating a simulation result in terms of a frequency characteristic of the alternating voltage Vo for a case where the series resonance frequency fs is lower than the resonance frequency fm of the vibration member 101. This simulation was performed for a circuit configuration shown in FIG. 10A. The resonance frequency of the vibration member 101 was assumed to be 44.142 kHz. The capacitance of the capacitor 103 was intentionally increased by 10% so that the series resonance frequency fs was set to 0.95·fm, i.e., 42.087 kHz which is smaller by about 2 kHz than fm. As can be seen from FIG. 10B, even when fs is not exactly equal to fm, it is possible to reduce the change in the alternating voltage Vo in an frequency range around the resonance frequency fm.

The capacitance of the capacitor 103 and the inductance of the inductor 102 may be determined in a similar manner to the first embodiment. That is, if the peak frequency fe of the alternating voltage Vo is first determined, then it is possible to uniquely determine a combination of the inductance and the capacitance.

As in the first embodiment, when the driving frequency of the vibration member 101 is denoted by fd, the peak frequency fe is set such that a condition shown below is satisfied.

$$fe < 1.5 \cdot fd$$

By setting the peak frequency fe so as to satisfy the above condition, it is possible to reduce the second-order harmonic component as described above with reference to FIG. 7. For example, when the driving frequency fd is 46 kHz, 1.5·fd is 69 kHz. In this case, in the circuit shown in FIG. 5, if the inductance L of the inductor 102 is set to be 40 μH, and the capacitance C of the capacitor 103 is set to be 0.325 μF, then the peak frequency fe is 61.3 kHz and thus the above-described condition is satisfied.

First Modification of Second Embodiment

FIG. 10A illustrates a driving circuit configured to drive a vibration-type actuator according to a first modification of the second embodiment of the present invention. In this configuration of the driving circuit, a secondary coil 401b of a transformer 401 is connected in parallel to the vibration member 101, and an inductor 102 and a capacitor 103 are connected in series to a primary coil 401a of the transformer 401. Note that the circuit configuration in terms of the inductor 102 and the capacitor 103 is not limited to that shown in FIG. 10A as long as the inductor 102 and the capacitor 103 are connected in series to the primary coil 401a of the transformer 401. When the inductor 102 is located on the primary side of the transformer 401, the inductance thereof may be as small as $1/N^2$ times the inductance which would be necessary when the inductor 102 is located on the secondary side. Note that N denotes the turn ratio. When the capacitor 103 is located on the primary side of the transformer 401, the withstand voltage of the capacitor 103 may be as small as 1/N times the withstand voltage which would be necessary when the capacitor 103 is located on the secondary side.

If the inductance of the inductor 102 is denoted by L and the capacitance of the capacitor 103 is denoted by C, the series resonance frequency fs is given by equation (2-3) shown below, which is the same as equation (1-1) described above.

$$fs = 1/(2\pi\sqrt{LC}) \qquad (2\text{-}3)$$

Figure 11A:
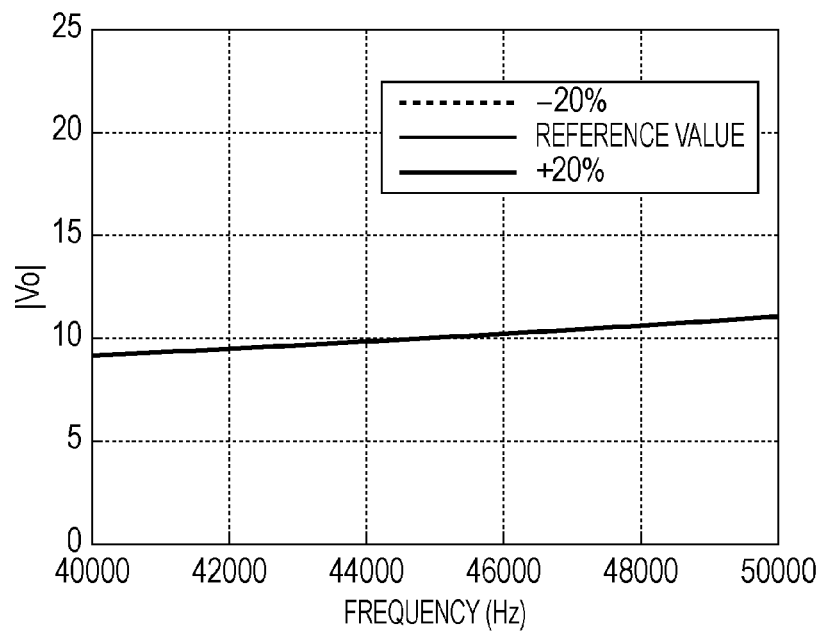
FIGS. 11A and 11B are diagrams illustrating simulation results in terms of changes of an alternating voltage Vo due to a variation of a load and a variation of an inductor.
Figure 11B:
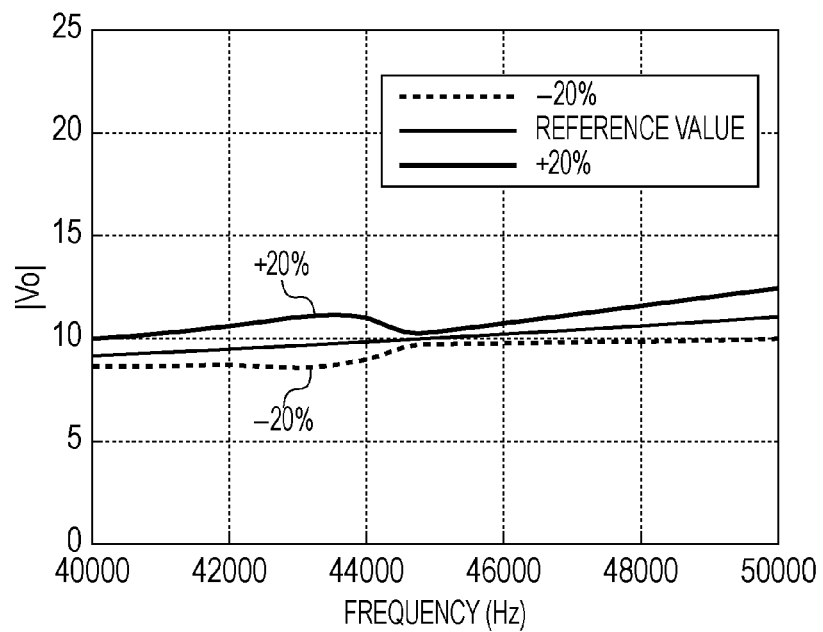

By setting the series resonance frequency fs determined according equation (2-3) so as to be equal to the resonance frequency fm of the vibration member 101, it is possible to achieve a gradual change in the frequency characteristic of the alternating voltage Vo in a range around fm. The reduction in the change in the frequency characteristic of the alternating voltage Vo in the range close to fm leads to a reduction in change of the alternating voltage Vo due to a variation of a load (equivalent resistor 301d of the mechanical vibration of the vibration member 101) or the inductor 102. FIGS. 11A and 11B illustrate effects of the reduction in change in the alternating voltage Vo. FIGS. 11A and 11B show simulation result in terms of change in the alternating voltage Vo due to variations of a load and the inductance of the inductor 102 for the circuit shown in FIG. 10A. More specifically, FIG. 11A illustrates a simulation result in terms of a change in the alternating voltage Vo due to a variation of the load. In FIG. 11A, to provide a better understanding about the change around the resonance frequency fm of the vibration member 101, the result is shown only for a frequency range from 40 kHz to 50 kHz in a horizontal axis. The calculation was performed for three different values of the load, i.e., a reference value and the reference value±20%. This variation of the load was assumed to appear as a change in the equivalent resistance Rm in the equivalent circuit of the vibration member 101. The result shown in FIG. 11A indicates that the variations of the load have substantially no effect on the alternating voltage Vo, thus high controllability can be achieved.

FIG. 11B shows a simulation result in terms of a change in the alternating voltage Vo due to a variation of the inductance of the inductor 102. The calculation was performed for three different values of the inductance of the inductor 102, i.e., a reference value and the reference value±20%. The result shown in FIG. 11B indicates the variation of the inductance of the inductor 102 does not have a significant influence on the alternating voltage Vo. That is, when the driving circuit has two or more phases, the variation of the inductance of the inductor 102 does not have a significant influence, and thus it is possible to reduce unevenness in the travelling wave.

In the present embodiment, the transformer 401 may have leakage inductance. In this case, it is necessary to take into count the effect of the leakage inductance in the calculation of the series resonance frequency fs substantially equal to the resonance frequency fm of the vibration member 101.

Second Modification of Second Embodiment

Figure 12A:
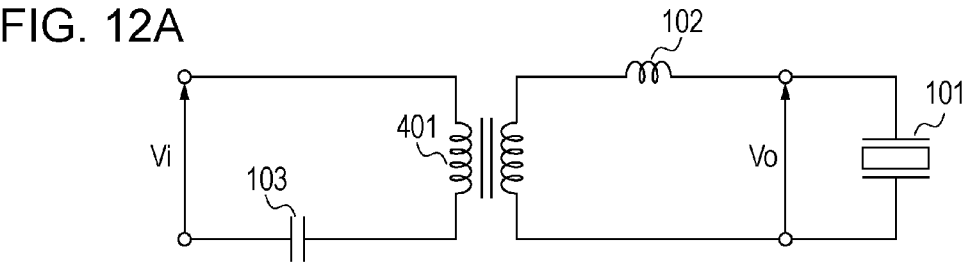
FIGS. 12A to 12E are diagrams illustrating driving circuits configured to drive a vibration-type actuator according to modified embodiments of the present invention.

FIG. 12A illustrates a driving circuit configured to drive a vibration-type actuator according to a second modification of the second embodiment of the present invention. In this configuration of the driving circuit, a secondary coil 401b of a transformer 401 is connected in parallel to the vibration member 101, a capacitor 103 is connected in series to a primary coil 401a of the transformer 401, and an inductor 102 is connected in series to the secondary coil 401b of the transformer 401. When the inductor 102 is located on the secondary side of the transformer 401, the maximum allowable current of the inductor 102 may be as small as 1/N of the maximum allowable current that would be necessary when the inductor 102 is located on the primary side of the transformer 401. Note that N denotes the turn ratio. If the inductance of the inductor 102 is L, and the capacitance of the capacitor 103 is C, then the series resonance frequency fs is given by equation (2-4) shown below.

$$fs = 1/(2\pi\sqrt{LC/N^2}) \quad (2-4)$$

By setting the series resonance frequency fs determined according equation (2-4) so as to be equal to the resonance frequency fm of the vibration member 101, it is possible to achieve a gradual change in the frequency characteristic of the alternating voltage Vo in a range around fm, and it is also possible to reduce the change in the alternating voltage Vo due to the variation of the load (equivalent resistor 301d) or the inductance of the inductor 102.

Third Modification of Second Embodiment

Figure 12B:
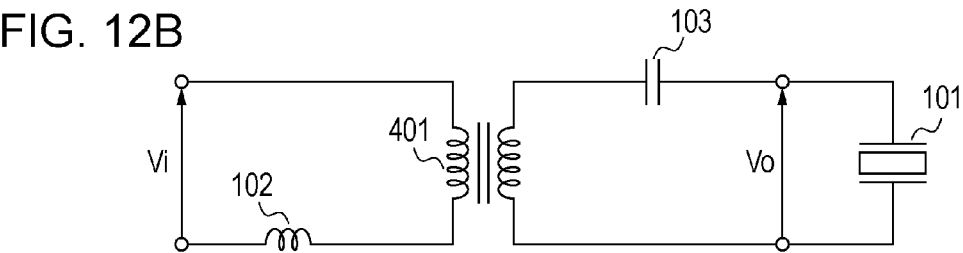

FIG. 12B illustrates a driving circuit configured to drive a vibration-type actuator according to a third modification of the second embodiment of the present invention. In this configuration of the driving circuit, a secondary coil 401b of a transformer 401 is connected in parallel to the vibration member 101, an inductor 102 is connected in series to a primary coil 401a of the transformer 401, and a capacitor 103 is connected in series to the secondary coil 401b of the transformer 401. When the inductor 102 is located on the primary side of the transformer 401, the inductance thereof may be as small as $1/N^2$ of the inductance which would be necessary when the inductor 102 is located on the secondary side. When the capacitor 103 is located on the secondary side of the transformer 401, the capacitance thereof may be as small as $1/N^2$ of the capacitance which would be necessary when the capacitor 103 is located on the primary side. In this configuration, the series resonance frequency fs is given by equation (2-5) shown below.

$$fs = 1/(2\pi\sqrt{LC \cdot N^2}) \quad (2-5)$$

The series resonance frequency fs determined according equation (2-5) is set to be equal to the resonance frequency fm of the vibration member 101.

Fourth Modification of Second Embodiment

Figure 12C:
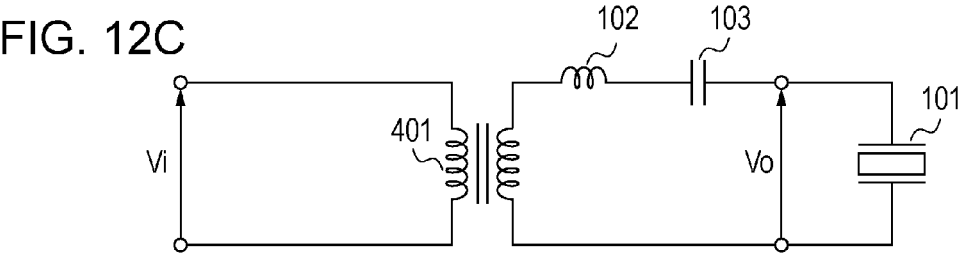

FIG. 12C illustrates a driving circuit configured to drive a vibration-type actuator according to a fourth modification of the second embodiment of the present invention. In this configuration of the driving circuit, a secondary coil 401b of a transformer 401 is connected in parallel to the vibration member 101, and an inductor 102 and a capacitor 103 are connected in series to a secondary coil 401b of the transformer 401. When the inductor 102 is located on the secondary side of the transformer 401, the maximum allowable current of the inductor 102 may be as small as 1/N of the maximum allowable current that would be necessary when the inductor 102 is located on the primary side of the transformer 401. When the capacitor 103 is located on the secondary side of the transformer 401, the capacitance thereof may be as small as $1/N^2$ of the capacitance which would be necessary when the capacitor 103 is located on the primary side. In this configuration, the series resonance frequency fs is given by equation (2-6) shown below.

$$fs = 1/(2\pi\sqrt{LC}) \quad (2-6)$$

The series resonance frequency fs determined according equation (2-6) is set to be equal to the resonance frequency fm of the vibration member 101.

Fifth Modification of Second Embodiment

Figure 12D:
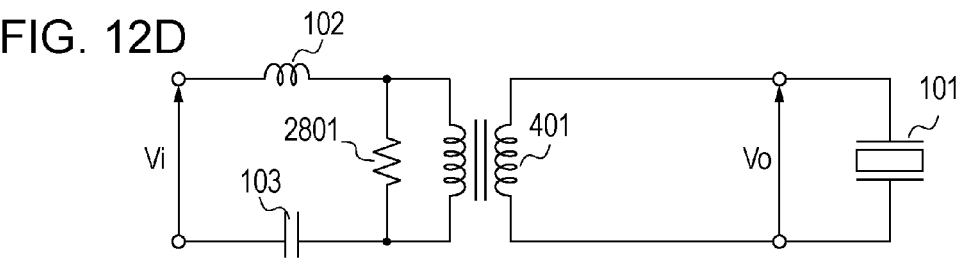

FIG. 12D illustrates a driving circuit configured to drive a vibration-type actuator according to a fifth modification of the second embodiment of the present invention. In this configuration, a resistor 2801 is connected in parallel to a primary coil 401a of a transformer 401. As described above, when a transformer is used as in the second embodiment and first to fourth modifications thereof, the connection of the inductor 102 and the capacitor 103 causes the alternating voltage Vo to have two peaks at frequencies higher and lower than fm. In the present modification, the provision of the resistor 2801 leads to a reduction in the peak at the lower frequency. The reduction in the peak at the lower frequency makes it possible to reduce an influence of disturbance in a low frequency range and an influence of a variation of the load.

Sixth Modification of Second Embodiment

Figure 12E:
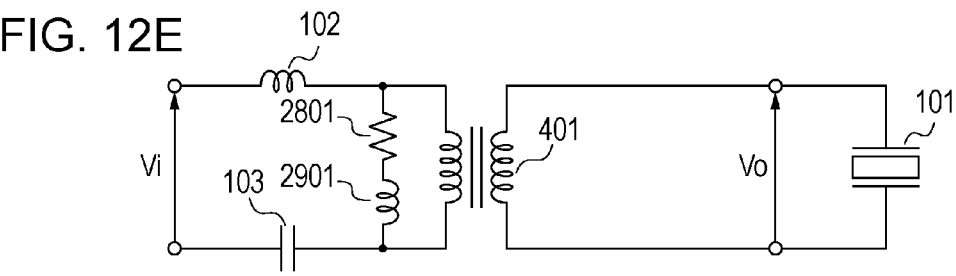

FIG. 12E illustrates a driving circuit configured to drive a vibration-type actuator according to a sixth modification of the second embodiment of the present invention. In this sixth modification, a resistor 2801 and an inductor 2901 for parallel resonance are connected in parallel to a primary coil 401a of a transformer. In this sixth modification, the inductor 2901 for parallel resonance provides a more effective reduction in the peak in the low frequency range. Note that in the present modification, fs can be determined according to equation (2-5) described above.

Figure 13A:
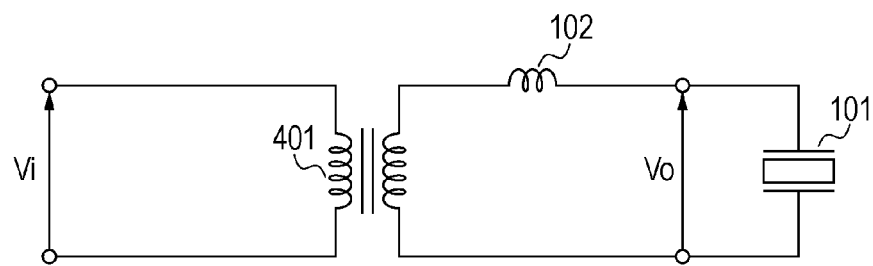
FIG. 13A is a diagram illustrating a comparative example of a driving circuit using a transformer configured to drive a vibration-type actuator according to a conventional technique.
Figure 13B:
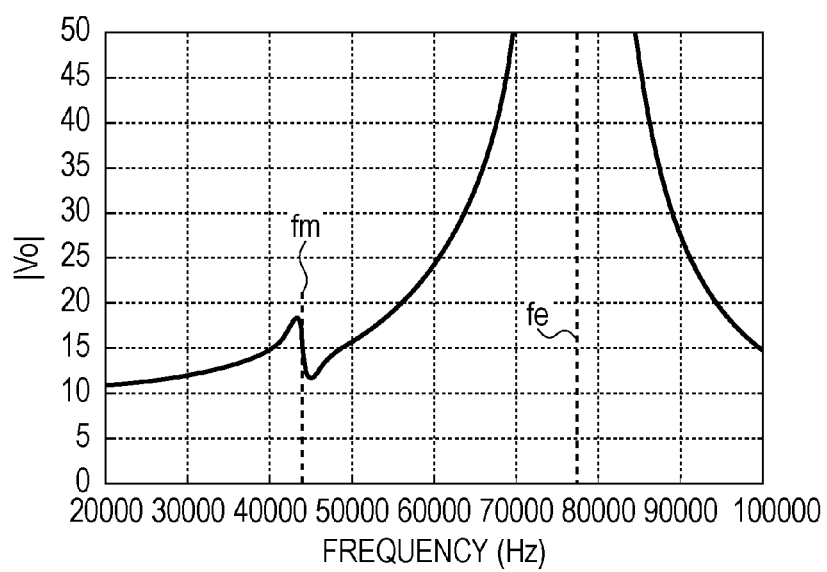
FIG. 13B is a diagram illustrating a simulated characteristic thereof.

Second Comparative Example in which Only an Inductance is Connected in Series to a Vibration Member Next, with reference to FIGS. 13A and 13B, a comparative example of a configuration is described in which a transformer is used and only an inductor 102 is connected in series to the vibration member 101. FIG. 13A illustrates a conventional driving circuit using a transformer for driving a vibration-type actuator. In this circuit configuration, an inductor 102 is connected in series to a secondary coil of the transformer 401. FIG. 13B shows a simulation result in terms of a frequency characteristic of an alternating voltage Vo output from the secondary side of the transformer 401 in the circuit shown in FIG. 13A. In the simulation, the inductance L of the inductor 102 was set to be 1.23 mH, the alternating voltage Vo was assumed to have a peak at a frequency of 76.707 kHz, and the resonance frequency of the vibration member 101 was assumed to be 44.142 kHz. As shown in FIG. 13B, the frequency characteristic of the alternating voltage Vo has a great change in voltage around fm, which leads to a reduction in controllability. A steep change occurs in the alternating voltage Vo in a range from the resonance frequency fm of the vibration member 101 to the peak frequency fe of Vo, and this steep change causes a high voltage to be output in a high range of the driving frequency. Therefore, circuit elements such as a switching element used in the driving circuit need to have a high withstand voltage, which causes an increase in cost.

Figure 14A:
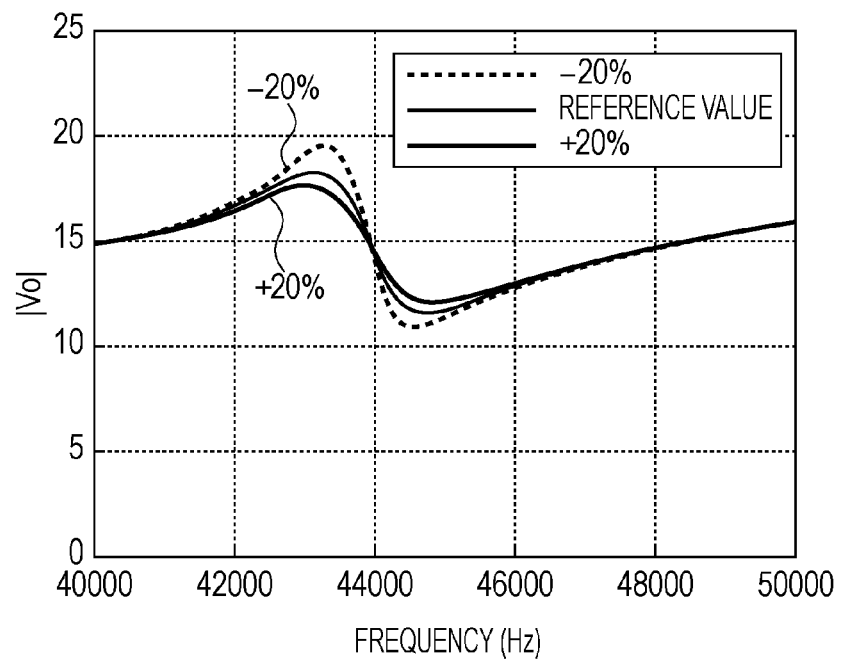
FIGS. 14A and 14B are diagrams illustrating simulation results in terms of changes of an alternating voltage Vo due to a variation of a load and a variation of an inductor of a comparative example of a driving circuit.
Figure 14B:
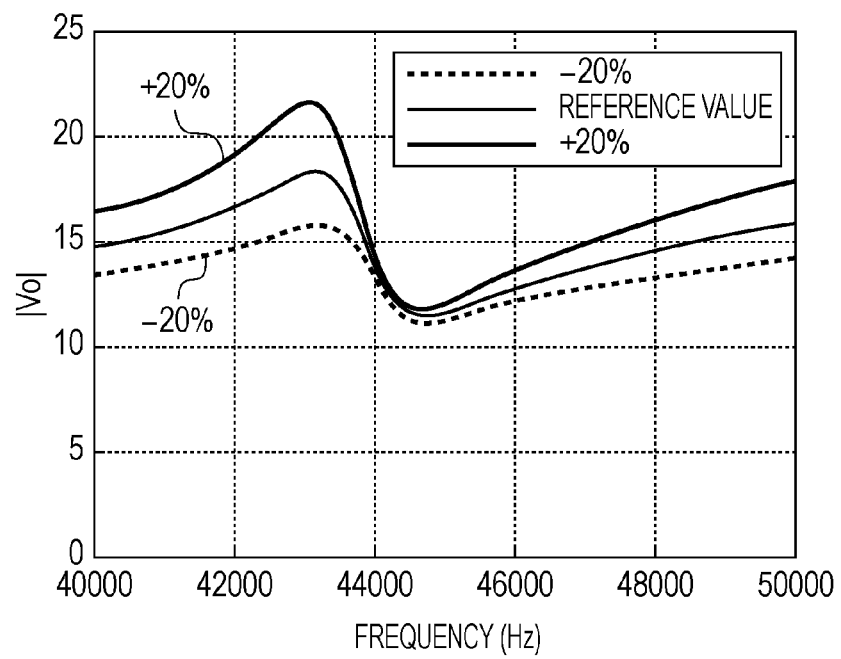

FIGS. 14A and 14B show simulation result in terms of change in the alternating voltage Vo due to variations of a load (equivalent resistor 301d) and the inductance of the inductor 102 for the circuit shown in FIG. 13A.

More specifically, FIG. 14A illustrates a simulation result in terms of a change in the alternating voltage Vo due to a variation of the load. To show more clearly the change in the alternating voltage Vo around the resonance frequency of the vibration member 101, the result is shown only for a frequency range from 40 kHz to 50 kHz in a horizontal axis. The calculation was performed for three values of the load, i.e., a reference value and the reference value±20%, This variation of the load was assumed to appear as a change in the equivalent resistance of the mechanical vibration in the equivalent circuit of the vibration member 101. The result shown in FIG. 14A indicates that the variation of the load causes a great change in the frequency characteristic of the alternating voltage Vo, which results in degradation in controllability.

FIG. 14B shows a simulation result in terms of a change in the alternating voltage Vo due to a variation of the inductance of the inductor 102. It was assumed that a coil was used as the inductor 102 and the calculation was performed for three different values of the inductance of the inductor 102, i.e., a reference value and the reference value±20%. As shown in FIG. 14B, the variation of the inductance of the inductor 102 causes a great change in the frequency characteristic of the alternating voltage Vo. Therefore, when the driving circuit has two or more phases, if the inductance of the coil is different among the phases, the amplitude of the alternating voltage Vo output from the driving circuit becomes different between the phases. That is, alternating voltages Vo with different amplitudes are applied at the same time to the respective driving electrodes 101a and 101b of the vibration member 101 shown in FIG. 16, which causes unevenness in the travelling wave.

Figure 15:
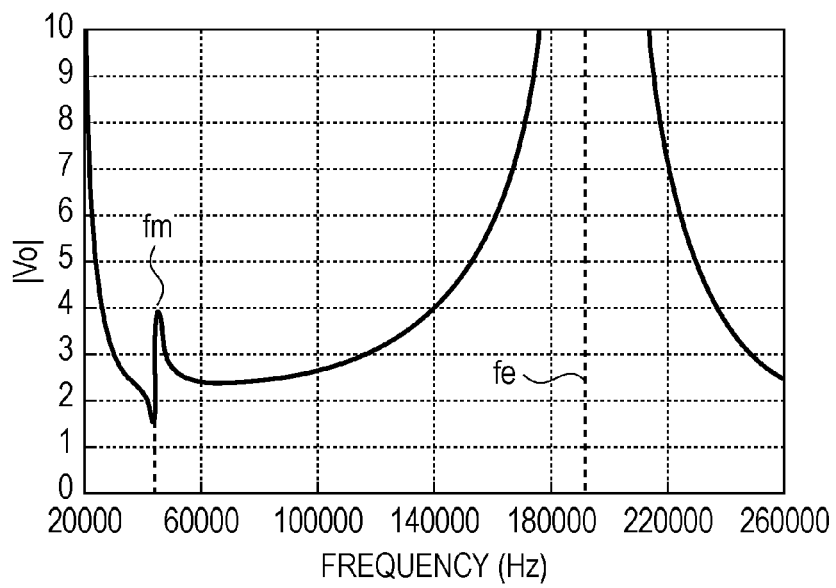
FIG. 15 is a diagram showing a simulation result in terms of a frequency characteristic of an alternating voltage Vo that is output according to a condition described in Japanese Patent Publication No. 5016277.

Third Comparative Example in which the Series Resonance Frequency of Capacitor 103 and Primary Coil 401a of Transformer is Set to be Equal to fm FIG. 15 shows a simulation result in terms of a frequency characteristic of an alternating voltage Vo output from a secondary coil of a transformer 401 for a case where the series resonance frequency of a capacitor 103 and a primary coil 401a of the transformer 401 is set to be equal to the resonance frequency fm of the vibration member 101. The simulation was performed for a circuit configuration shown in FIG. 16. The transformer 401 was assumed to have an ideal coupling (with a coupling coefficient of 1) with no leakage inductance. Furthermore, it was also assumed that the inductance of the primary coil 401a of the transformer 401 was 150 μH and the inductance of the secondary coil 401b of the transformer 401 was 15 mH. The capacitance of the capacitor 103 connected to the primary coil 401a of the transformer 401 was set to 86.7 nF, and the inductance of the inductor 102 connected to the secondary coil 401b of the transformer 401 was set to 1 mH. The resonance frequency fm of the vibration member 101 was assumed to be 44.142 kHz. Note that the series resonance frequency of the capacitor 103 and the inductor 102 is 170.96 kHz which is greatly different from fm. The peak frequency fe of the alternating voltage Vo was 190.927 kHz.

The simulation result shown in FIG. 15 indicates that the frequency characteristic of the alternating voltage Vo has a great voltage change around fm. The simulation also has revealed that the alternating voltage Vo has a great change in phase in a frequency range around fm. That is, Japanese Patent Publication No. 5016277 discloses only the series resonance of the capacitor 103 and the primary coil 401a of the transformer, but Japanese Patent Publication No. 5016277 does not disclose the technique to adjust the series resonance frequency of the capacitor 103 and the inductor 102. Thus, in the technique disclosed in Japanese Patent Publication No. 5016277, a great change can occur in the alternating voltage Vo in a frequency range around fm. Furthermore, the steep change in the alternating voltage Vo in a range from the resonance frequency fm of the vibration member 101 to the peak frequency fe of Vo can cause a high voltage to be output in a high range of the driving frequency. Therefore, circuit elements such as a switching element used in the driving circuit need to have a high withstand voltage, which causes an increase in cost. Furthermore, this leads to an increase in the alternating voltage Vo due to a variation of the load (equivalent resistor 301d) or the inductor 102.

Figure 16:
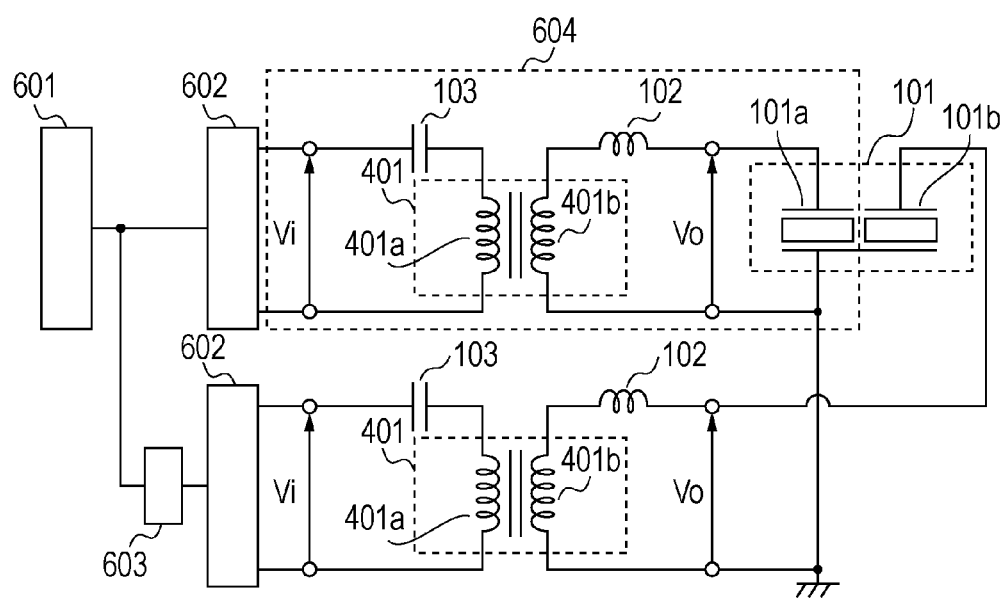
FIG. 16 is a diagram illustrating a driving circuit disclosed in Japanese Patent Publication No. 5016277.

Note that the circuit configuration shown in FIG. 16 may be used in the present invention. In this circuit configuration shown in FIG. 16, by setting fs such that 0.73·fm<fs<1.2·fm, it is possible to achieve a gradual change in the frequency characteristic of the alternating voltage Vo in a range around fm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
    a vibration-type actuator comprising a vibration member and a moving member, wherein the vibration member includes an electro-mechanical energy conversion element and the moving member is configured to move relative to the vibration member; and
    a driving circuit comprising a capacitor and an inductor connected in series with the capacitor to the electro-mechanical energy conversion element,
    wherein parameters of the driving circuit are set such that, when a series resonance frequency of the inductor and the capacitor is denoted by fs and a resonance frequency of the vibration member is denoted by fm, a condition 0.73·fm<fs<1.2·fm is satisfied.

2. The apparatus according to claim 1, wherein, if a peak frequency of an alternating voltage applied to the electro-mechanical energy conversion element is denoted by fe and a driving frequency of the vibration member is denoted by fd, a condition fe<1.5·fd is satisfied.

3. The apparatus according to claim 1, wherein the vibration member is configured to generate a vibration wave in response to an alternating voltage applied to the electro-mechanical energy conversion element.

4. The apparatus according to claim 1, wherein the moving member is configured to move in response to a vibration wave relative to the vibration member.

5. An apparatus comprising:
    a vibration-type actuator comprising a vibration member and a moving member, wherein the vibration member includes an electro-mechanical energy conversion element and the moving member is configured to move relative to the vibration member; and a driving circuit comprising a transformer, an inductor, and a capacitor, wherein the transformer includes a primary coil and a secondary coil and is connected in parallel to the electro-mechanical energy conversion element, wherein an alternating voltage is configured to be applied to the primary coil, and wherein the inductor and the capacitor are located at least one of on a primary side and a secondary side of the transformer such that the inductor and the capacitor are connected in series to the electro-mechanical energy conversion element, wherein parameters of the driving circuit are set such that, when a series resonance frequency of the inductor and the capacitor is denoted by fs and a resonance frequency of the vibration member is denoted by fm, a condition 0.73·fm<fs<1.2·fm is satisfied.

6. The driving circuit according to claim 5, wherein the inductor is a leakage inductance of the transformer.

7. The driving circuit according to claim 5, wherein, if a peak frequency of an alternating voltage applied to the electro-mechanical energy conversion element is denoted by fe and a driving frequency of the vibration member is denoted by fd, a condition fe<1.5·fd is satisfied.

8. The apparatus according to claim 5, wherein the vibration member is configured to generate a vibration wave in response to an alternating voltage applied to the electro-mechanical energy conversion element.

9. The apparatus according to claim 5, wherein the moving member is configured to move in response to a vibration wave relative to the vibration member.

10. An apparatus comprising:
a vibration member including an electro-mechanical energy conversion element; and
a driving circuit comprising a capacitor and an inductor connected in series with the capacitor to the electro-mechanical energy conversion element,
wherein parameters of the driving circuit are set such that, when a series resonance frequency of the inductor and the capacitor is denoted by fs and a resonance frequency of the vibration member is denoted by fm, a condition 0.73·fm<fs<1.2·fm is satisfied.

11. The apparatus according to claim 10, wherein, if a peak frequency of an alternating voltage applied to the electro-mechanical energy conversion element is denoted by fe and a driving frequency of the vibration member is denoted by fd, a condition fe<1.5·fd is satisfied.

12. The apparatus according to claim 10, wherein the vibration member is configured to generate a vibration wave in response to an alternating voltage applied to the electro-mechanical energy conversion element.

13. The apparatus according to claim 10, further comprising a moving member configured to move relative to the vibration member.

14. The apparatus according to claim 13, wherein the moving member is configured to move in response to a vibration wave relative to the vibration member.

15. An apparatus comprising:
a vibration member including an electro-mechanical energy conversion element; and
a driving circuit comprising a transformer, an inductor, and a capacitor,
wherein the transformer includes a primary coil and a secondary coil and is connected in parallel to the electro-mechanical energy conversion element, wherein an alternating voltage is configured to be applied to the primary coil, and
wherein the inductor and the capacitor are located at least one of on a primary side and a secondary side of the transformer such that the inductor and the capacitor are connected in series to the electro-mechanical energy conversion element,
wherein parameters of the driving circuit are set such that, when a series resonance frequency of the inductor and the capacitor is denoted by fs and a resonance frequency of the vibration member is denoted by fm, a condition 0.73·fm<fs<1.2·fm is satisfied.

16. The driving circuit according to claim 15, wherein the inductor is a leakage inductance of the transformer.

17. The driving circuit according to claim 15, wherein, if a peak frequency of an alternating voltage applied to the electro-mechanical energy conversion element is denoted by fe and a driving frequency of the vibration member is denoted by fd, a condition fe<1.5·fd is satisfied.

18. The apparatus according to claim 15, wherein the vibration member is configured to generate a vibration wave in response to an alternating voltage applied to the electro-mechanical energy conversion element.

19. The apparatus according to claim 15, further comprising a moving member configured to move relative to the vibration member.

20. The apparatus according to claim 19, wherein the moving member is configured to move in response to a vibration wave relative to the vibration member.

* * * * *